(12) United States Patent
He

(10) Patent No.: US 12,494,717 B2
(45) Date of Patent: Dec. 9, 2025

(54) DIRECT CURRENT CONVERTER, COMMUNICATION DEVICE, AND PHOTOVOLTAIC SYSTEM

(71) Applicant: Huawei Digital Power Technologies Co., Ltd., Shenzhen (CN)

(72) Inventor: Zhengyan He, Dongguan (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/765,715

(22) Filed: Jul. 8, 2024

(65) Prior Publication Data
US 2024/0364226 A1 Oct. 31, 2024

Related U.S. Application Data

(63) Continuation of application No. PCT/CN2022/111839, filed on Aug. 11, 2022.

(51) Int. Cl.
*H02M 3/335* (2006.01)
*H02J 3/38* (2006.01)
*H02M 3/00* (2006.01)

(52) U.S. Cl.
CPC .......... *H02M 3/33573* (2021.05); *H02J 3/38* (2013.01); *H02M 3/015* (2021.05); *H02M 3/33592* (2013.01); *H02J 2300/24* (2020.01)

(58) Field of Classification Search
CPC .................................................. H02M 3/3376
See application file for complete search history.

(56) References Cited

U.S. PATENT DOCUMENTS 11,837,868 B2 * 12/2023 Meng .................. H02S 50/00

FOREIGN PATENT DOCUMENTS

| CN | 206658155 U | 11/2017 | |
|---|---|---|---|
| CN | 111010043 A | 4/2020 | |
| CN | 111181408 A | 5/2020 | |
| CN | 114844362 A * | 8/2022 | .............. H02M 1/08 |

OTHER PUBLICATIONS

Vinnikov et al., "Wide Input Voltage Range High Step-Up DC-DC Converter with Fault-Tolerant Operation Capability", IEEE International Conference on Industrial Technology (ICIT), IEEE, XP33573206, Feb. 13, 2019, 6 pages.

* cited by examiner

*Primary Examiner* — Daniel Kessie
(74) *Attorney, Agent, or Firm* — Maier & Maier, PLLC

(57) ABSTRACT

A direct current converter includes a full-bridge inverter, a control module, a transformer, a resonant circuit, and a rectifier module. The full-bridge inverter includes a first switching device, a second switching device, a third switching device, and a fourth switching device. The control module adjusts a duty cycle of the first switching device, the second switching device, the third switching device, or the fourth switching device to a first duty cycle. The control module further controls a working frequency of the direct current converter to be a first working frequency, where an absolute value of a difference between the first working frequency and a resonant frequency of the resonant circuit is less than or equal to a threshold.

13 Claims, 7 Drawing Sheets

DIRECT CURRENT CONVERTER, COMMUNICATION DEVICE, AND PHOTOVOLTAIC SYSTEM

CROSS-REFERENCE OF RELATED APPLICATIONS

This application is a continuation of International application No. PCT/CN2022/111839, filed on Aug. 11, 2022, the disclosure of which is hereby incorporated by reference in its entirety.

TECHNICAL FIELD

The embodiments relate to the field of electronic circuit technologies, a direct current converter, a communication device, and a photovoltaic system.

BACKGROUND

In the communication field, a direct current bus may be used to supply power to a communication device, and then a direct current converter inside the communication device converts a direct current provided by the direct current bus into a direct current of a voltage required by the communication device for use. With continuous development of communication technologies, communication devices develop toward a larger capacity and a smaller size. A larger capacity means that the direct current converter needs to output a larger power, and a smaller size means a smaller plate area of the direct current converter. In addition, a smaller plate area also means a larger heat dissipation limitation of the direct current converter. A larger output power requires a smaller heat dissipation loss, that is, requires higher conversion efficiency of the direct current converter. It can be learned that the direct current converter needs to develop toward high power, high efficiency, and high power density. Therefore, how to improve efficiency of the direct current converter is very important.

SUMMARY

The embodiments include a direct current converter, a communication device, and a photovoltaic system, to improve efficiency of the direct current converter.

According to a first aspect, the embodiments include a direct current converter. The direct current converter may include a full-bridge inverter, a control module, a transformer, a resonant circuit, and a rectifier module. The full-bridge inverter includes a first switching device, a second switching device, a third switching device, and a fourth switching device. First ends of the first switching device, the second switching device, the third switching device, and the fourth switching device are separately coupled to the control module. A second end of the first switching device is coupled to a second end of the third switching device. A third end of the second switching device is coupled to a third end of the fourth switching device. A third end of the first switching device is separately coupled to a second end of the second switching device and the transformer. A third end of the third switching device is separately coupled to a second end of the fourth switching device and the transformer. The transformer is further separately coupled to the resonant circuit and the rectifier module. The control module is configured to adjust a duty cycle of the first switching device, the second switching device, the third switching device, or the fourth switching device to a first duty cycle, so that an output voltage of the direct current converter is a first voltage, where the first duty cycle is greater than 0 and less than or equal to 0.5. The control module is further configured to control a working frequency of the direct current converter to be a first working frequency, where an absolute value of a difference between the first working frequency and a resonant frequency of the resonant circuit is less than or equal to a threshold, so that a switching device other than the first switching device, the second switching device, the third switching device, or the fourth switching device that is adjusted in the direct current converter works in a soft switching state.

In this embodiment, the control module controls the absolute value of the difference between the working frequency of the direct current converter and the resonant frequency of the resonant circuit to be less than or equal to the threshold (that is, controls the working frequency of the direct current converter to be equal to the resonant frequency of the resonant circuit as much as possible), and adjusts a duty cycle of one switching device. This can ensure that in a working process of the direct current converter, only the adjusted switching device works in a hard switching state, and all other switching devices work in the soft switching state. Because a quantity of switching devices working in the hard switching state in the direct current converter is reduced, a switching loss of the switching devices is reduced, and efficiency of the direct current converter can be improved. In addition, because a duty cycle of one switching device is adjustable, output voltage stabilization can be ensured.

In a possible implementation, the direct current converter may further include a direct current blocking capacitor. One end of a primary coil of the transformer is coupled to the third end of the first switching device, the other end of the primary coil of the transformer is coupled to the third end of the third switching device through the direct current blocking capacitor, and a secondary coil of the transformer is coupled to the rectifier module through the resonant circuit. The resonant circuit includes a resonant capacitor and a resonant inductor, a capacitance of the direct current blocking capacitor is greater than that of the resonant capacitor, and a magnetic inductor of the transformer is greater than the resonant inductor.

In this embodiment, the direct current blocking capacitor is coupled to the primary coil of the transformer in series, the resonant circuit is coupled to the secondary coil of the transformer in series, a capacitance of the direct current blocking capacitor is greater than (that is, far greater than) that of the resonant capacitor, and the magnetic inductor of the transformer is greater than (that is, far greater than) the resonant inductor. This can ensure that a switching device other than a switching device working in the hard switching state can better work in the soft switching state, to improve efficiency of the direct current converter.

In a possible implementation, the resonant circuit may include a resonant capacitor and a resonant inductor. One end of a primary coil of the transformer is coupled to the third end of the first switching device, and the other end of the primary coil of the transformer is coupled to the third end of the third switching device through the resonant capacitor. One end of a secondary coil of the transformer is coupled to the rectifier module, the other end of the secondary coil of the transformer is coupled to the rectifier module through the resonant inductor, and a magnetic inductor of the transformer is greater than the resonant inductor.

In this embodiment, the resonant capacitor is coupled to the primary coil of the transformer in series, the resonant inductor is coupled to the secondary coil of the transformer in series, and the magnetic inductor of the transformer is greater than (that is, far greater than) the resonant inductor. This can ensure that a switching device other than a switching device working in the hard switching state can better work in the soft switching state, to improve efficiency of the direct current converter.

In a possible implementation, the direct current converter may further include a direct current blocking capacitor. The direct current blocking capacitor is coupled to the resonant inductor in series, and a capacitance of the direct current blocking capacitor is greater than that of the resonant capacitor.

In this embodiment, a capacitance of the direct current blocking capacitor is greater than (that is, is far greater than) that of the resonant capacitor. This can ensure that a switching device other than a switching device working in the hard switching state can better work in the soft switching state, to improve efficiency of the direct current converter.

In a possible implementation, the control module is configured to control working frequencies of the first switching device, the second switching device, the third switching device, and the fourth switching device to be the first working frequency, and the resonant frequency to be $1/2\pi \sqrt{LrCr}$, where Lr is an inductance of the resonant inductor, and Cr is a capacitance of the resonant capacitor.

In this embodiment, the control module controls absolute values of differences between the working frequencies of the first switching device, the second switching device, the third switching device, and the fourth switching device and the resonant frequency of the resonant circuit to be less than a threshold (that is, approximately equal). This can ensure that in a working process of the direct current converter, only a switching device whose duty cycle can be adjusted in the full-bridge inverter works in the hard switching state, and all other three switching devices work in the soft switching state.

In a possible implementation, the rectifier module may include four diodes or four switching devices. When the rectifier module includes four switching devices, first ends of the four switching devices are separately coupled to the control module, and the control module is further configured to control the four switching devices to perform unidirectional synchronous rectification.

In this embodiment, when the rectifier module performs rectification by using a diode, the diode has no reverse current. This can ensure that the diode has no turn-off loss, to improve efficiency of the direct current converter. When the rectifier module performs synchronous rectification by using a switching device, the control module controls the switching device to perform unidirectional synchronous rectification. That is, there is only a current in one direction, and there is no reverse current when the switching device is turned off. This can ensure that the switching device in the rectifier module has no turn-off loss, to improve efficiency of the direct current converter.

In a possible implementation, the switching device may be a metal-oxide semiconductor field-effect transistor (MOSFET), an insulated gate bipolar transistor (IGBT), a gallium nitride (GaN) switching device, or a silicon carbide (SiC) switching device.

According to a second aspect, the embodiments include a direct current converter. The direct current converter may include a full-bridge inverter, a control module, a transformer, a resonant circuit, and a rectifier module. The full-bridge inverter includes a first switching device, a second switching device, a third switching device, and a fourth switching device. First ends of the first switching device, the second switching device, the third switching device, and the fourth switching device are separately coupled to the control module. A second end of the first switching device is coupled to a second end of the third switching device. A third end of the second switching device is coupled to a third end of the fourth switching device. A third end of the first switching device is separately coupled to a second end of the second switching device and the transformer. A third end of the third switching device is separately coupled to a second end of the fourth switching device and the transformer. The transformer is further separately coupled to the resonant circuit and the rectifier module. The control module is configured to adjust working time of the first switching device to first time, so that an output voltage of the direct current converter is a first voltage, where the first time is less than or equal to working time of the fourth switching device. The control module is further configured to control working time of the third switching device to be second time, where an absolute value of a difference between the second time and a half of a resonant period of the resonant circuit is less than or equal to a threshold, so that a switching device other than the first switching device in the direct current converter works in a soft switching state.

In this embodiment, the control module controls the working time of the first switching device to be the first time, and the absolute value of the difference between the first time and the half of the resonant period of the resonant circuit is less than the threshold (that is, the working time of the first switching device is controlled to be equal to the half of the resonant period of the resonant circuit as much as possible). This can ensure that in a working process of the direct current converter, only one switching device, such as the third switching device, works in a hard switching state and other switching devices work in the soft switching state. Because a quantity of switching devices working in the hard switching state in the direct current converter is reduced, a switching loss of the switching devices is reduced, and efficiency of the direct current converter can be improved. In addition, because working time of the third switching device is adjustable, output voltage stabilization can be ensured.

In a possible implementation, the direct current converter may further include a direct current blocking capacitor. One end of a primary coil of the transformer is coupled to the third end of the first switching device, the other end of the primary coil of the transformer is coupled to the third end of the third switching device through the direct current blocking capacitor, and a secondary coil of the transformer is coupled to the rectifier module through the resonant circuit. The resonant circuit includes a resonant capacitor and a resonant inductor, a capacitance of the direct current blocking capacitor is greater than that of the resonant capacitor, and a magnetic inductor of the transformer is greater than the resonant inductor.

In this embodiment, the direct current blocking capacitor is coupled to the primary coil of the transformer in series, the resonant circuit is coupled to the secondary coil of the transformer in series, a capacitance of the direct current blocking capacitor is greater than (that is, far greater than) that of the resonant capacitor, and the magnetic inductor of the transformer is greater than (that is, far greater than) the resonant inductor. This can ensure that a switching device other than a switching device working in the hard switching state can better work in the soft switching state, to improve efficiency of the direct current converter.

In a possible implementation, the resonant circuit may include a resonant capacitor and a resonant inductor. One end of a primary coil of the transformer is coupled to the third end of the first switching device, and the other end of the primary coil of the transformer is coupled to the third end of the third switching device through the resonant capacitor. One end of a secondary coil of the transformer is coupled to the rectifier module, the other end of the secondary coil of the transformer is coupled to the rectifier module through the resonant inductor, and a magnetic inductor of the transformer is greater than the resonant inductor.

In this embodiment, the resonant capacitor is coupled to the primary coil of the transformer in series, the resonant inductor is coupled to the secondary coil of the transformer in series, and the magnetic inductor of the transformer is greater than (that is, far greater than) the resonant inductor. This can ensure that a switching device other than a switching device working in the hard switching state can better work in the soft switching state, to improve efficiency of the direct current converter.

In a possible implementation, the direct current converter may further include a direct current blocking capacitor. The direct current blocking capacitor is coupled to the resonant inductor in series, and a capacitance of the direct current blocking capacitor is greater than that of the resonant capacitor.

In this embodiment, a capacitance of the direct current blocking capacitor is greater than (that is, is far greater than) that of the resonant capacitor. This can ensure that a switching device other than a switching device working in the hard switching state can better work in the soft switching state, to improve efficiency of the direct current converter.

In a possible implementation, the resonant period is $2\pi\sqrt{L_r C_r}$, Lr is an inductance of the resonant inductor, and Cr is a capacitance of the resonant capacitor.

In a possible implementation, the rectifier module may include four diodes or four switching devices. When the rectifier module includes four switching devices, first ends of the four switching devices are separately coupled to the control module, and the control module is further configured to control the four switching devices to perform unidirectional synchronous rectification.

In this embodiment, when the rectifier module performs rectification by using a diode, the diode has no reverse current. This can ensure that the diode has no turn-off loss, to improve efficiency of the direct current converter. When the rectifier module performs synchronous rectification by using a switching device, the control module controls the switching device to perform unidirectional synchronous rectification. That is, there is only a current in one direction, and there is no reverse current when the switching device is turned off. This can ensure that the switching device in the rectifier module has no turn-off loss, to improve efficiency of the direct current converter.

In a possible implementation, the switching device is any one of a MOSFET, an IGBT, a GaN switching device, and a SiC switching device.

According to a third aspect, the embodiments include a communication device. The communication device may include a transceiver, and the direct current converter in any one of the first aspect or the possible implementations of the first aspect coupled to the transceiver, or the direct current converter in any one of the second aspect or the possible implementations of the second aspect. The direct current converter is configured to supply power to the transceiver.

According to a fourth aspect, the embodiments include a photovoltaic system. The photovoltaic system may include a photovoltaic device and the direct current converter in any one of the first aspect or the possible implementations of the first aspect coupled to the photovoltaic device, or the direct current converter in any one of the second aspect or the possible implementations of the second aspect. The photovoltaic device is configured to provide a first direct current for the direct current converter.

In a possible implementation, the photovoltaic system may further include an energy storage apparatus, and the direct current converter is coupled to a power grid through the storage apparatus.

In a possible implementation, the photovoltaic system may further include an inverter, and the energy storage apparatus is coupled to the power grid through the inverter.

DETAILED DESCRIPTION OF EMBODIMENTS

Figure 1:
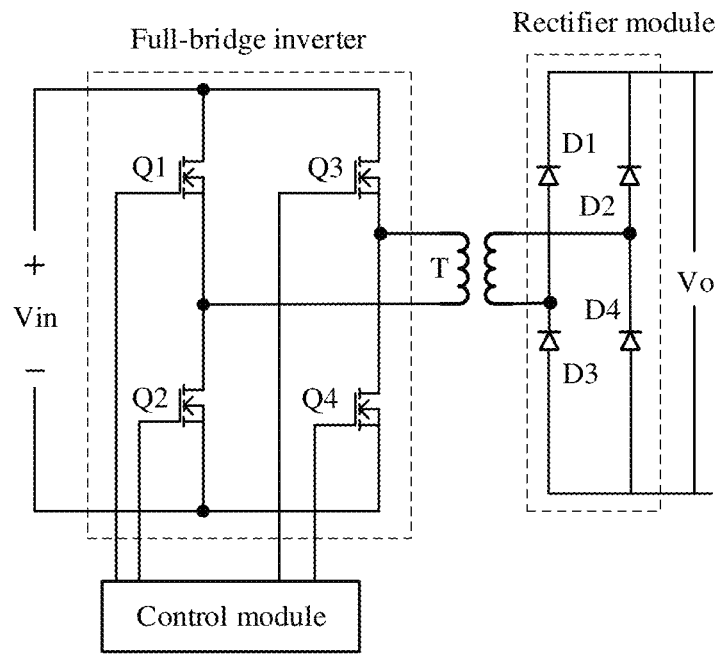
FIG. 1 is a schematic diagram of a structure of a direct current converter according to an embodiment.

The embodiments include a direct current converter, a communication device, and a photovoltaic system, to improve efficiency of the direct current converter. The following describes the embodiments with reference to the accompanying drawings in the embodiments.

In the embodiments and accompanying drawings, the terms "first", "second", "third", "fourth" and so on are intended to distinguish between different objects but do not indicate a particular order. In addition, the term "including," or any other variant thereof, is intended to cover a non-exclusive inclusion. For example, a process that includes a series of modules is not limited to the listed steps or modules, but optionally further includes modules that are not listed, or optionally further includes other modules inherent to these devices.

An "embodiment" means that a particular feature, structure, or characteristic described with reference to this embodiment may be included in at least one embodiment. The embodiments may be combined with another embodiment.

It should be understood that "coupling" may be direct coupling, that is, direct connection (that is, electrical connection); or may be indirect coupling, that is, indirect connection, that is, connection is performed through another component, element, module, apparatus, or the like.

To better understand the direct current converter, the communication device, and the photovoltaic system in the embodiments, the following first describes related concepts.

In hard switching, neither a voltage nor a current is zero in a switching process, and the voltage and the current change rapidly. Obvious overshoot occurs in a waveform, resulting in switching noise. The hard switching has high turn-on and turn-off losses.

Soft switching means that a semiconductor device withstands a zero voltage or a zero current in a switching process. That is, the semiconductor device is turned on (or turned off) under a zero voltage condition and is turned off (or turned on) under a zero current condition. In turn-on and turn-off processes of soft switching, waveforms of a voltage and a current almost do not overlap. Therefore, turn-on and turn-off losses can be reduced to very low.

To better understand the direct current converter, the communication device, and the photovoltaic system in the embodiments, the following first describes related technologies.

In the communication field, a direct current bus may be used to supply power to a communication device. Then, a direct current (DC) direct current converter (referred to as a direct current converter for short in the following), that is, a board mount power (BMP), in the communication device converts a direct current provided by the direct current bus into a direct current of a voltage required by the communication device for use. 48 V is a standard power supply voltage of the direct current bus commonly used in the communication field. The direct current converter in the communication device converts a direct current of 48 V into a direct current of 12 V for use.

48 V is an example of the power supply voltage of the direct current bus and constitutes no limitation thereto. For different communication devices and power supply architectures, the direct current bus may provide direct currents of different voltages. For example, a voltage of a direct current provided by the direct current bus may be in a range of 36 V to 72 V.

A conversion output of the direct current converter needs to meet an isolation and closed-loop voltage stabilization requirement. In addition, the direct current converter needs to meet an industry standard shape and size. Currently, a common standard size of the direct current converter may include ¼ brick, ⅛ brick, 1/16 brick, and the like.

It can be understood that the direct current converter needs to meet the isolation and closed-loop voltage stabilization requirement in a wide range of input. At present, a common switching topology that meets the requirement is a full-bridge topology. The full-bridge topology is widely used because of its simple principle, simple design, simple control, and good dynamic characteristics.

FIG. 1 is a schematic diagram of a structure of a direct current converter according to an embodiment. As shown in FIG. 1, the direct current converter may include a full-bridge inverter, a control module, a transformer T, and a rectifier module. The full-bridge inverter may include switching devices Q1 to Q4, and the rectifier module may include diodes D1 to D4. The control module may control the switching devices Q1 to Q4 included in the full-bridge inverter to convert an input first direct current into a first alternating current. The transformer T may convert the first alternating current into a second alternating current. The diodes D1 to D4 included in the rectifier module may convert the second alternating current into a second direct current for output.

However, in the direct current converter shown in FIG. 1, all the four switching devices included in the full-bridge inverter work in a hard switching state. Consequently, a primary-side coil of the transformer T has a large hard switching loss, and a diode included in the rectifier module connected to a secondary-side coil of the transformer T has a very large reverse recovery loss. As a result, power consumption of the direct current converter is large, and efficiency of the direct current converter is reduced. For example, the efficiency of the direct current converter is lower when the direct current converter works under a large current condition.

The embodiments provide a new direct current converter to improve efficiency of the direct current converter.

Figure 2:
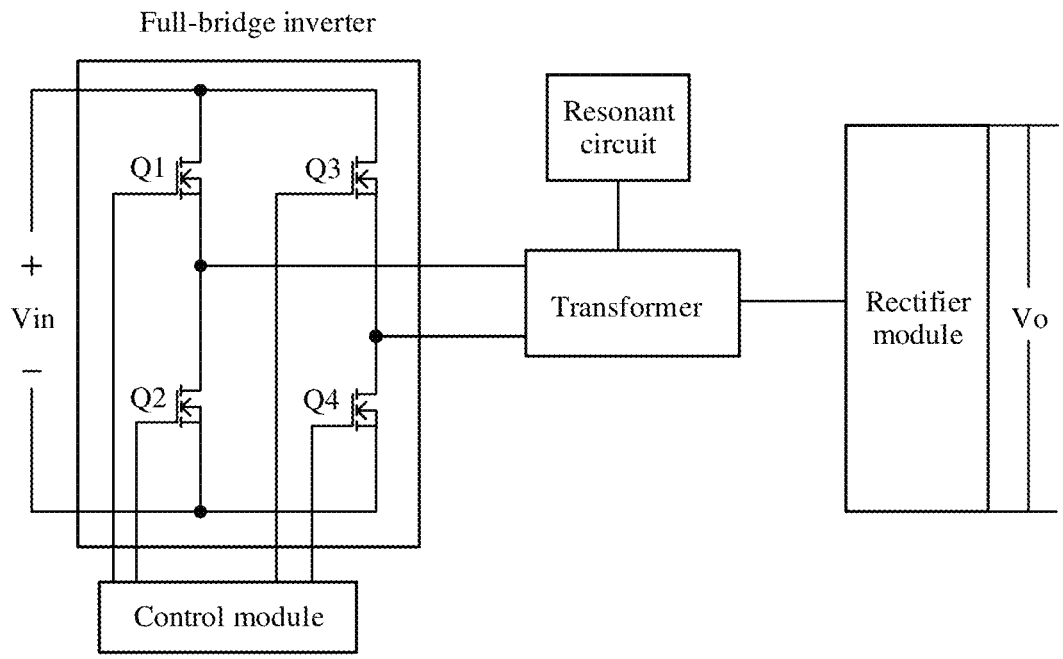
FIG. 2 is a schematic diagram of a structure of another direct current converter according to an embodiment.

FIG. 2 is a schematic diagram of a structure of another direct current converter according to an embodiment. As shown in FIG. 2, the direct current converter may include a full-bridge inverter, a control module, a transformer, a resonant circuit, and a rectifier module. The full-bridge inverter may include a first switching device Q1, a second switching device Q2, a third switching device Q3, and a fourth switching device Q4. First ends of the first switching device Q1, the second switching device Q2, the third switching device Q3, and the fourth switching device Q4 are separately coupled to the control module. A second end of the first switching device Q1 is coupled to a second end of the third switching device Q3. A third end of the second switching device Q2 is coupled to a third end of the fourth switching device Q4. A third end of the first switching device Q1 is separately coupled to a second end of the second switching device Q2 and the transformer. A third end of the third switching device Q3 is separately coupled to a second end of the fourth switching device Q4 and the transformer. The transformer is further separately coupled to the resonant circuit and the rectifier module.

The control module is configured to adjust a duty cycle of the first switching device Q1, the second switching device Q2, the third switching device Q3, or the fourth switching device Q4 to a first duty cycle, so that an output voltage of the direct current converter is a first voltage. The first duty cycle is greater than 0 and less than or equal to 0.5.

The control module is further configured to control a working frequency of the direct current converter to be a first working frequency, where an absolute value of a difference between the first working frequency and a resonant frequency of the resonant circuit is less than or equal to a threshold, so that a switching device other than the first switching device Q1, the second switching device Q2, the third switching device Q3, or the fourth switching device Q4 that is adjusted in the direct current converter works in a soft switching state.

It should be noted that "the switching device other than the first switching device Q1, the second switching device Q2, the third switching device Q3, or the fourth switching device Q4 that is adjusted works in the soft switching state" means that in the first switching device Q1, the second switching device Q2, the third switching device Q3, and the fourth switching device Q4, three switching devices other than one adjusted switching device work in the soft switching state. For example, if the first switching device Q1 is adjusted, the second switching device Q2, the third switching device Q3, and the fourth switching device Q4 work in the soft switching state. Alternatively, if the second switching device Q2 is adjusted, the first switching device Q1, the third switching device Q3, and the fourth switching device Q4 work in the soft switching state. Alternatively, if the third switching device Q3 is adjusted, the first switching device Q1, the second switching device Q2, and the fourth switching device Q4 work in the soft switching state. Alternatively, if the fourth switching device Q4 is adjusted, the first switching device Q1, the second switching device Q2, and the third switching device Q3 work in the soft switching state.

The switching device may be a MOSFET, an IGBT, a GaN switching device, a SiC switching device, or another switching device. This is not limited herein. FIG. 2 and the following are described by using an example in which the switching device is a MOSFET. In this case, a first end of the switching device is a gate of the MOSFET, a second end of the switching device is a source (or a drain) of the MOSFET, and a third end of the switching device is a drain (or a source) of the MOSFET.

When a voltage required by a power supply device, apparatus, or module of the direct current converter is determined, that is, the output voltage of the direct current converter is determined, the control module may adjust a duty cycle of the first switching device Q1, the second switching device Q2, the third switching device Q3, or the fourth switching device Q4 to the first duty cycle, so that the output voltage of the direct current converter is the first voltage. The first voltage is the voltage required by the power supply device, apparatus, or module of the direct current converter. It can be understood that the control module may adjust the output voltage of the direct current converter by adjusting a duty cycle of one switching device in the full-bridge inverter. Therefore, when the voltage required by the power supply device, apparatus, or module of the direct current converter is the first voltage, the control module may adjust a duty cycle of one switching device in the full-bridge inverter, so that the output voltage of the direct current converter is the first voltage. In different application scenarios, different power supply architectures, or different devices, the first voltage may be different, and the first duty cycle may be different, to ensure that the direct current converter can meet different output voltages in different requirements. The first duty cycle is greater than 0 and less than or equal to 0.5.

The first duty cycle may be a duty cycle of the first switching device Q1, a duty cycle of the second switching device Q2, a duty cycle of the third switching device Q3, or a duty cycle of the fourth switching device Q4. Driving of the first switching device Q1 and driving of the second switching device Q2 are complementary to each other. In one period, when the first switching device Q1 is turned on, the second switching device Q2 is turned off, and when the first switching device Q1 is turned off, the second switching device Q2 is turned on. The control module may control driving of the first switching device Q1 and driving of the second switching device Q2 to be complementary to each other. Driving of the third switching device Q3 and driving the fourth switching device Q4 are complementary to each other. In one period, when the third switching device Q3 is turned on, the fourth switching device Q4 is turned off, and when the third switching device Q3 is turned off, the fourth switching device Q4 is turned on. The control module may control driving of the third switching device Q3 and driving of the fourth switching device Q4 to be complementary to each other. It may be understood that a sum of the duty cycle of the first switching device Q1 and the duty cycle of the second switching device Q2 is 1, and similarly, a sum of the duty cycle of the third switching device Q3 and the duty cycle of the fourth switching device Q4 is 1.

For example, when the duty cycle of the first switching device Q1 is the first duty cycle, the duty cycle of the second switching device Q2 is a difference between 1 and the first duty cycle. Duty cycles of the third switching device Q3 and the fourth switching device Q4 are fixed, and each may be 0.5. For example, when the duty cycle of the second switching device Q2 is the first duty cycle, the duty cycle of the first switching device Q1 is a difference between 1 and the first duty cycle. Duty cycles of the third switching device Q3 and the fourth switching device Q4 are fixed, and each may be 0.5. For example, when the duty cycle of the third switching device Q3 is the first duty cycle, the duty cycle of the fourth switching device Q4 is a difference between 1 and the first duty cycle. Duty cycles of the first switching device Q1 and the second switching device Q2 are fixed, and each may be 0.5. For example, when the duty cycle of the fourth switching device Q4 is the first duty cycle, the duty cycle of the third switching device Q3 is a difference between 1 and the first duty cycle. Duty cycles of the first switching device Q1 and the second switching device Q2 are fixed, and each may be 0.5.

That the control module controls the working frequency of the direct current converter to be the first working frequency, where the absolute value of the difference between the first working frequency and the resonant frequency of the resonant circuit is less than or equal to the threshold may be understood as: The control module controls the working frequency of the direct current converter to be approximately equal (that is, as equal as possible) to the resonant frequency of the resonant circuit.

The threshold may be a fixed value. That is, values of the threshold in different direct current converters are the same. In this case, the threshold should be set to a small value, so that regardless of whether the resonant frequency of the resonant circuit is large or small, it can be ensured that the resonant frequency is approximately equal to the working frequency of the direct current converter.

The threshold may alternatively be variable. That is, the threshold may be different in different direct current converters. In this case, the threshold may be determined based on the resonant frequency of the resonant circuit. That is, the threshold may be different for different resonant frequencies of the resonant circuit. For example, when the resonant frequency of the resonant circuit is 1000 hertz (Hz), the threshold may be 10. When the resonant frequency of the resonant circuit is 100 hertz (Hz), the threshold may be 1.

The foregoing is an example of determining the threshold based on the resonant frequency of the resonant circuit and does not constitute a limitation thereto.

The working frequency of the direct current converter may include working frequencies of switching devices in the direct current converter. The working frequencies of the switching devices in the direct current converter may include working frequencies of the first switching device Q1, the second switching device Q2, the third switching device Q3, and the fourth switching device Q4. The control module may control the working frequencies of the first switching device Q1, the second switching device Q2, the third switching device Q3, and the fourth switching device Q4 to be the same, and the working frequencies are determined based on the resonant frequency of the resonant circuit.

When the resonant circuit is determined, the resonant frequency of the resonant circuit is also determined. Therefore, the control module may control, based on the resonant frequency of the resonant circuit, the first switching device Q1, the second switching device Q2, and the third switching device Q3 in the full-bridge inverter to be turned on and the working frequency of the fourth switching device Q4 to be the first working frequency, and adjust a duty cycle of the first switching device Q1, the second switching device Q2, the third switching device Q3, or the fourth switching device Q4, so that the full-bridge inverter can convert an input first direct current into a first alternating current. The transformer may convert the first alternating current into a second alternating current. The rectifier module may convert the second alternating current into a second direct current for output.

Vin in FIG. 2 is a voltage of a direct current input to the direct current converter. The direct current may be provided by a direct current bus, a direct current power supply, or by another circuit, apparatus, or device.

Vo in FIG. 2 is a voltage of a direct current output by the direct current converter.

The output voltage Vo ranges from Vin/N to Vin/2N. N is a turn ratio of a transformer, that is, a ratio of a quantity of turns of a secondary coil of the transformer to a quantity of turns of a primary coil of the transformer.

The direct current converter in FIG. 2 may further include a direct current blocking capacitor C1. One end of a primary coil of the transformer T is coupled to the third end of the first switching device Q1, the other end of the primary coil of the transformer T is coupled to the third end of the third switching device Q3 through the direct current blocking capacitor C1, and a secondary coil of the transformer T is coupled to the rectifier module through the resonant circuit.

The resonant circuit may include a resonant capacitor Cr and a resonant inductor Lr. The direct current blocking capacitor C1 is greater than the resonant capacitor Cr, and a magnetic inductor of the transformer T is greater than the resonant inductor Lr.

The direct current blocking capacitor C1 is used for direct current blocking. The resonant capacitor Cr and the resonant inductor Lr are configured to generate a resonant frequency, and the resonant frequency F is $1/2\pi\sqrt{LrCr}$. In the formula, Lr is an inductance of the resonant inductor Lr, and Cr is a capacitance of the resonant capacitor Cr. The following describes coupling of the secondary coil of the transformer T to the rectifier module through the resonant circuit with reference to FIG. 3 to FIG. 5.

Figure 3:
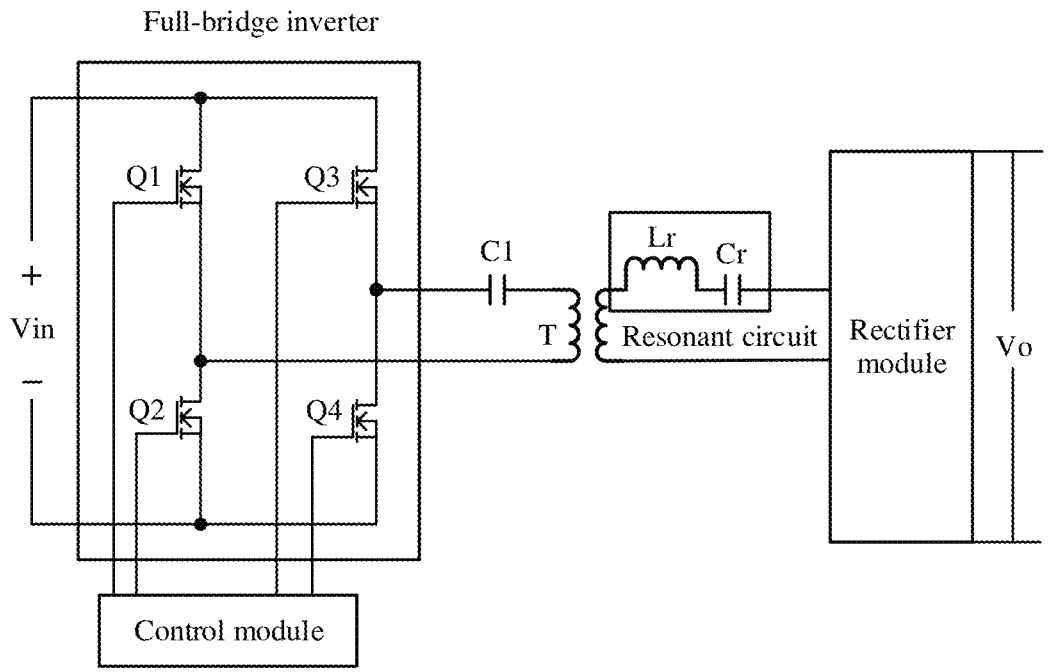
FIG. 3 is a schematic diagram of a structure of still another direct current converter according to an embodiment.
Figure 4:
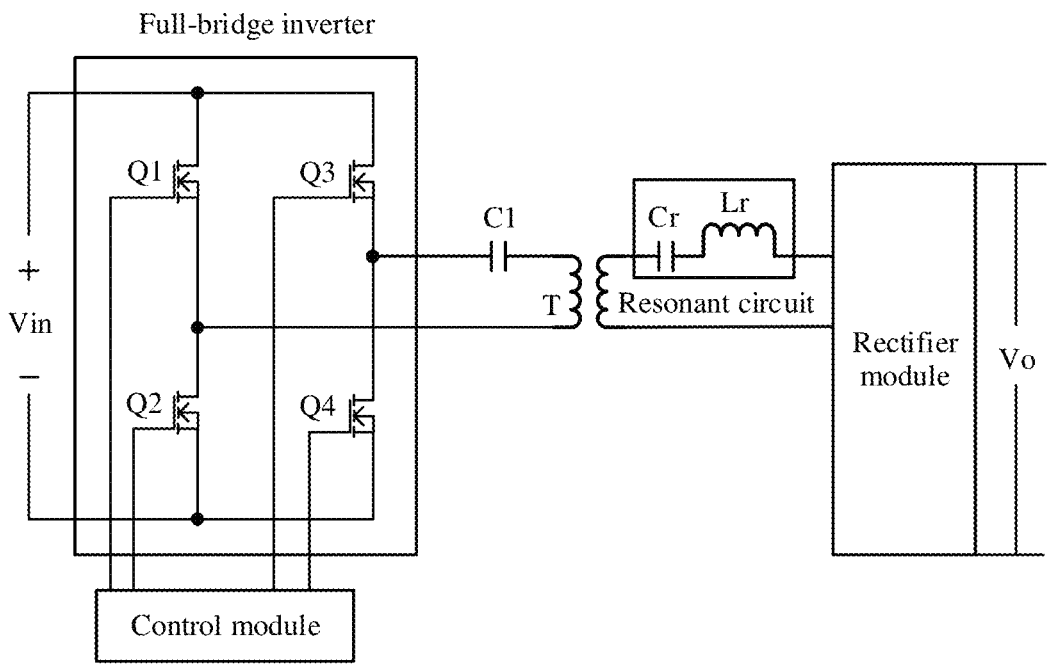
FIG. 4 is a schematic diagram of a structure of still another direct current converter according to an embodiment.
Figure 5:
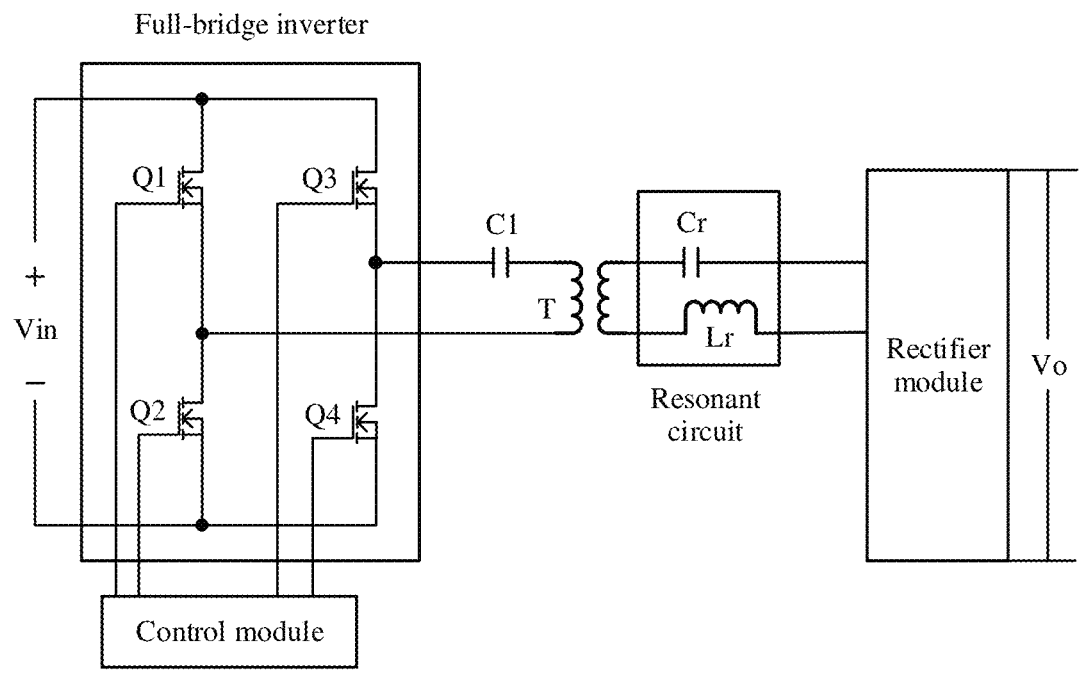
FIG. 5 is a schematic diagram of a structure of still another direct current converter according to an embodiment.

As shown in FIG. 3, one end of the secondary coil of the transformer T is coupled to the rectifier module, the other end of the secondary coil of the transformer T is coupled to one end of the resonant capacitor Cr through the resonant inductor Lr, and the other end of the resonant capacitor Cr is coupled to the rectifier module. As shown in FIG. 4, one end of the secondary coil of the transformer T is coupled to the rectifier module, the other end of the secondary coil of the transformer T is coupled to one end of the resonant inductor Lr through the resonant capacitor Cr, and the other end of the resonant inductor Lr is coupled to the rectifier module. As shown in FIG. 5, one end of the secondary coil of the transformer T may be coupled to the rectifier module through the resonant inductor Lr, and the other end of the secondary coil of the transformer T may be coupled to the rectifier module through the resonant capacitor Cr. It can be understood that a location of the resonant inductor Lr and a location of the resonant capacitor Cr are not limited, provided that the resonant inductor Lr and the resonant capacitor Cr are coupled in series to the secondary coil of the transformer T, and the resonant inductor Lr and the resonant capacitor Cr are coupled in series.

That the direct current blocking capacitor C1 is greater than the resonant capacitor Cr herein may be understood as: A capacitance of the direct current blocking capacitor C1 is far greater than a capacitance of the resonant capacitor Cr. That the magnetic inductor of the transformer T is greater than the resonant inductor Lr may be understood as: An inductance of the magnetic inductor of the transformer T is far greater than an inductance of the resonant inductor Lr. This can reduce impact of the direct current blocking capacitor C1 and the magnetic inductor of the transformer T on the resonant frequency of the resonant circuit, so that when the first switching device Q1, the second switching device Q2, and the third switching device Q3 are turned on and the fourth switching device Q4 works at the first working frequency, the direct current blocking capacitor C1 is far greater than the resonant capacitor Cr, and the magnetic inductor of the transformer T is far greater than the resonant inductor Lr. This can ensure that an alternating current in the direct current converter is close to an ideal sine wave, and further can ensure that in the foregoing switching devices, one switching device works in a hard switching state, and all other switches work in the soft switching state.

A connection relationship of the primary coil of the transformer T may be replaced as follows: One end of the primary coil of the transformer T is coupled to the third end of the first switching device Q1 through the direct current blocking capacitor C1, and the other end of the primary coil of the transformer T is coupled to the third end of the third switching device Q3.

Figure 6:
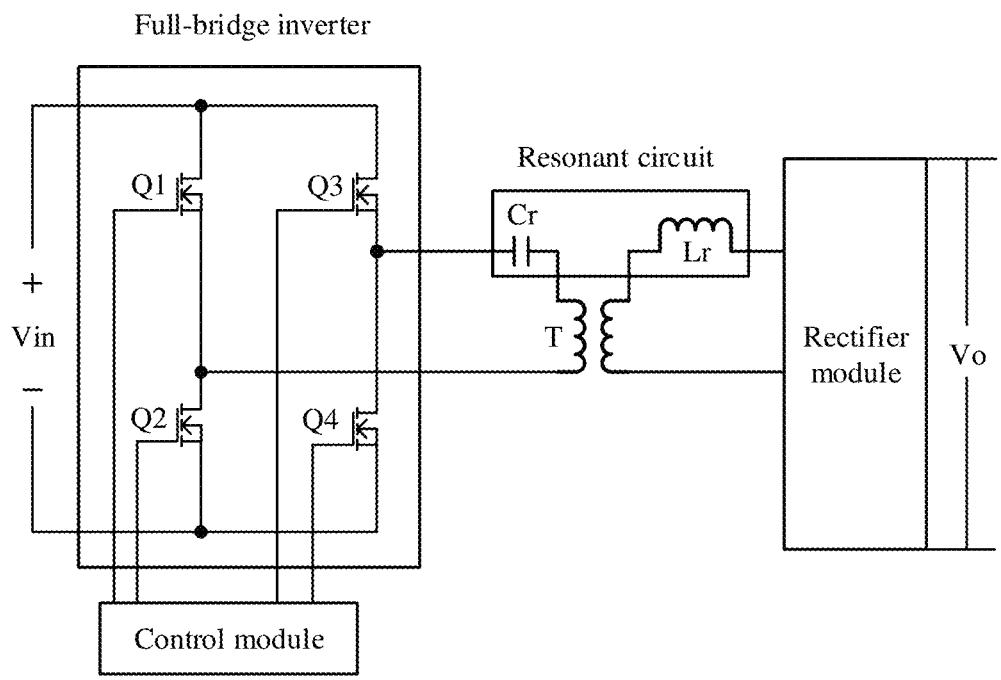
FIG. 6 is a schematic diagram of a structure of still another direct current converter according to an embodiment.

In another case, for structures of the transformer T and the resonant circuit in FIG. 2, refer to FIG. 6. As shown in FIG. 6, the resonant circuit may include a resonant capacitor Cr and a resonant inductor Lr. One end of a primary coil of the transformer T is coupled to the third end of the first switching device Q1, and the other end of the primary coil of the transformer T is coupled to the third end of the third switching device Q3 through the resonant capacitor Cr. One end of a secondary coil of the transformer T is coupled to the rectifier module, and the other end of the secondary coil of the transformer T is coupled to the rectifier module through the resonant inductor Lr. A magnetic inductor of the transformer T may be greater than the resonant inductor Lr.

It can be understood from FIG. 3 to FIG. 6 that the resonant capacitor Cr and the resonant inductor Lr may be located on one side of the secondary coil of the transformer T at the same time. The resonant inductor Lr may be located on one side of the secondary coil of the transformer T, and the resonant capacitor Cr may be located on one side of the primary coil of the transformer T. That is, the resonant inductor Lr and the resonant capacitor Cr in the resonant circuit may be respectively located on two sides of the two coils of the transformer.

That the magnetic inductor of the transformer T is greater than the resonant inductor Lr herein may be understood as: An inductance of the magnetic inductor of the transformer T is far greater than an inductance of the resonant inductor Lr. This can reduce impact of the magnetic inductor of the transformer T on the resonant frequency of the resonant circuit, so that when the first switching device Q1, the second switching device Q2, and the third switching device Q3 are turned on and the fourth switching device Q4 works at the first working frequency, the magnetic inductor of the transformer T is far greater than the resonant inductor Lr. This can ensure that an alternating current in the direct current converter is close to an ideal sine wave, and further can ensure that in the foregoing switching devices, one switching device works in a hard switching state, and all other switches work in the soft switching state.

Optionally, the direct current converter may further include a direct current blocking capacitor C1. The direct current blocking capacitor C1 is coupled to the resonant inductor Lr in series, and the direct current blocking capacitor C1 is greater than the resonant capacitor Cr.

That the direct current blocking capacitor C1 is greater than the resonant capacitor Cr herein may be understood as: A capacitance of the direct current blocking capacitor C1 is far greater than a capacitance of the resonant capacitor Cr. This can reduce impact of the direct current blocking capacitor C1 on the resonant frequency of the resonant circuit, so that when the first switching device Q1, the second switching device Q2, and the third switching device Q3 are turned on and the fourth switching device Q4 works at the first working frequency, the direct current blocking capacitor C1 is greater than the resonant capacitor Cr. This can ensure that in the foregoing switching devices, one switching device works in the hard switching state, and all other switches work in the soft switching state.

Figure 7:
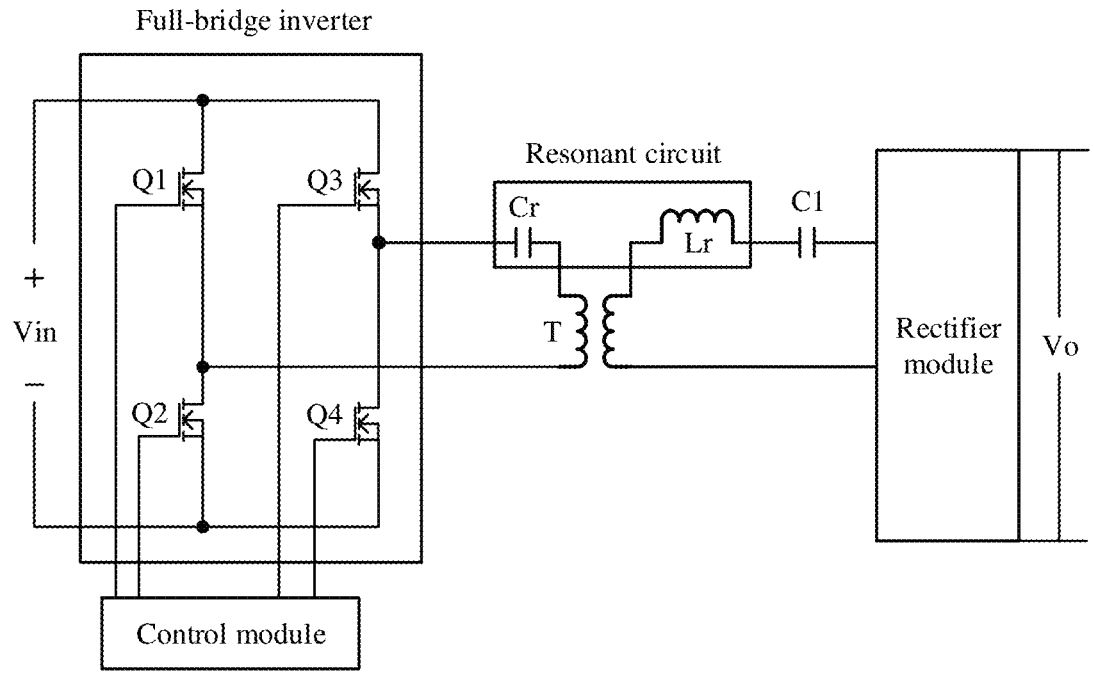
FIG. 7 is a schematic diagram of a structure of still another direct current converter according to an embodiment.
Figure 8:
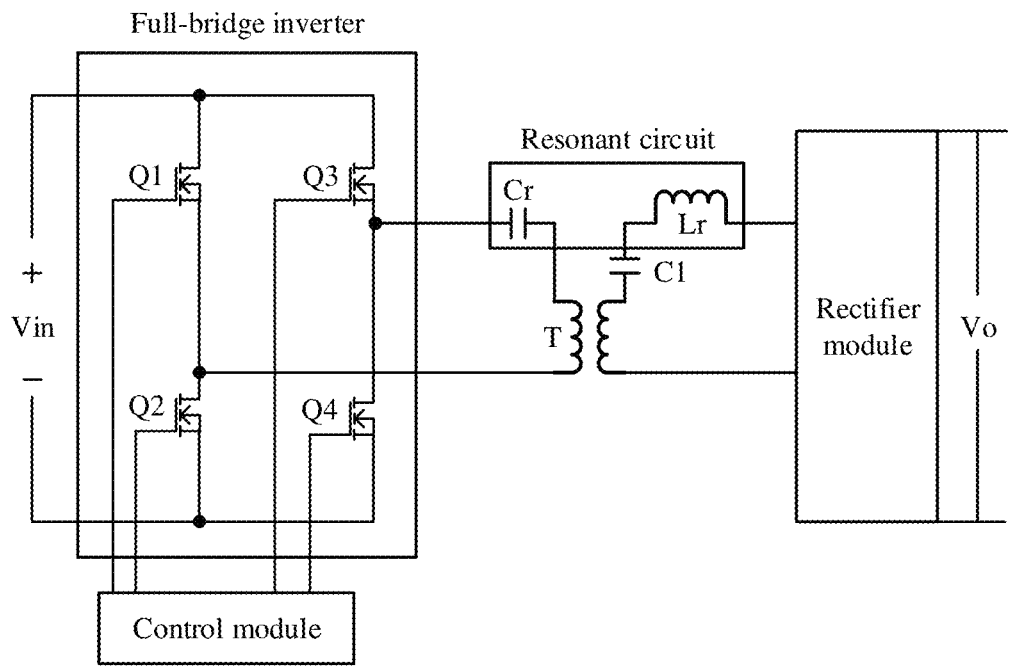
FIG. 8 is a schematic diagram of a structure of still another direct current converter according to an embodiment.
Figure 9:
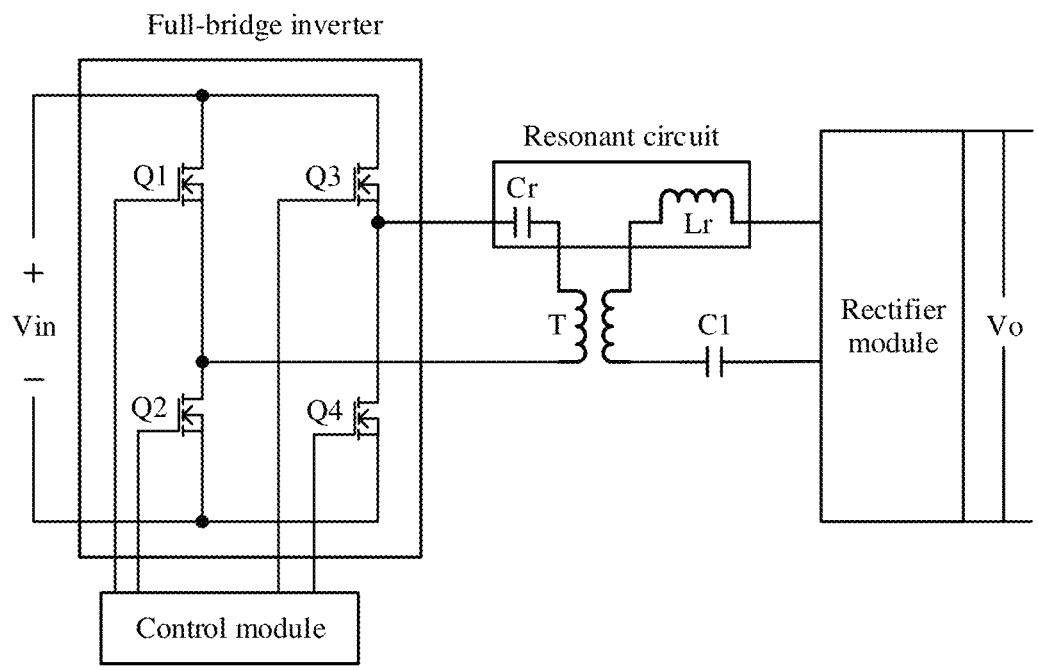
FIG. 9 is a schematic diagram of a structure of still another direct current converter according to an embodiment.

The following may describe locations of the resonant inductor Lr and the direct current blocking capacitor C1 with reference to FIG. 7 to FIG. 9. As shown in FIG. 7, one end of the secondary coil of the transformer T is coupled to the rectifier module, the other end of the secondary coil of the transformer T is coupled to one end of the direct current blocking capacitor C1 through the resonant inductor Lr, and the other end of the direct current blocking capacitor C1 is coupled to the rectifier module. As shown in FIG. 8, one end of the secondary coil of the transformer T is coupled to the rectifier module, the other end of the secondary coil of the transformer T is coupled to one end of the resonant inductor Lr through the direct current blocking capacitor C1, and the other end of the resonant inductor Lr is coupled to the rectifier module. As shown in FIG. 9, one end of the secondary coil of the transformer T may be coupled to the rectifier module through the direct current blocking capacitor C1, and the other end of the secondary coil of the transformer T may be coupled to the rectifier module through the resonant inductor Lr. It can be understood that a location of the resonant inductor Lr and a location of the direct current blocking capacitor C1 are not limited, provided that the resonant inductor Lr and the direct current blocking capacitor C1 are coupled in series to the secondary coil of the transformer T, and the resonant inductor Lr and the direct current blocking capacitor C1 are coupled in series.

A connection relationship of the primary coil of the transformer T may be replaced as follows: One end of the primary coil of the transformer T is coupled to the third end of the first switching device Q1 through the resonant capacitor Cr, and the other end of the primary coil of the transformer T is coupled to the third end of the third switching device Q3.

Figure 10:
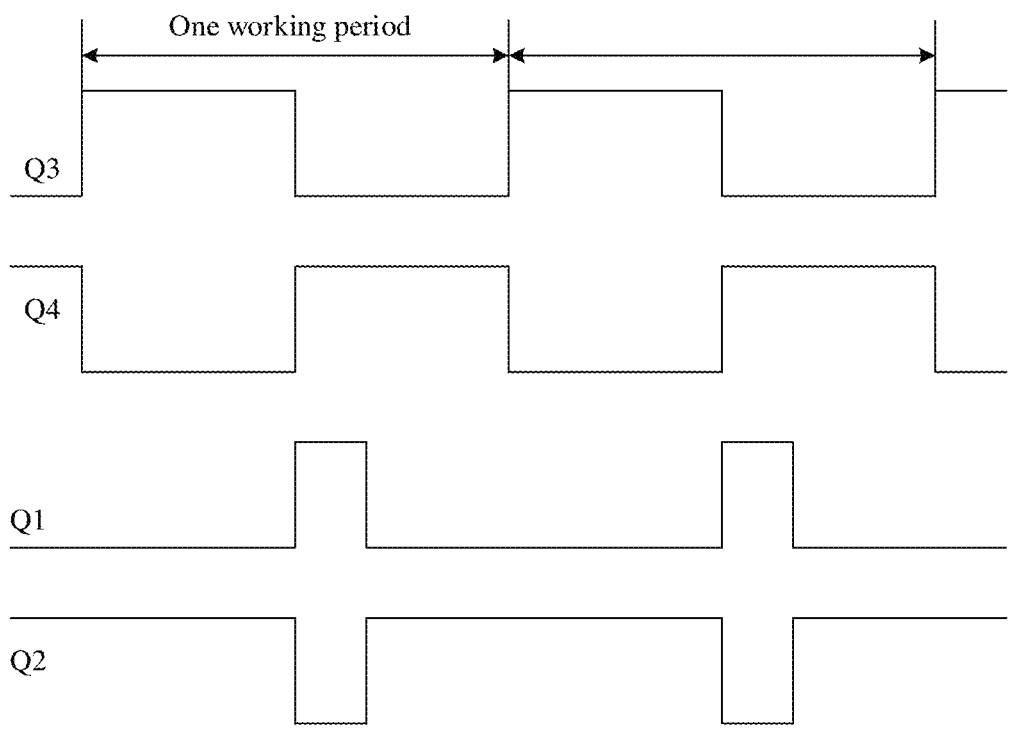
FIG. 10 is a working sequence diagram of a full-bridge inverter according to an embodiment.

FIG. 3 is used as an example to describe working principles of the four switching devices in the inverter module. FIG. 10 is a working sequence diagram of the first switching device Q1, the second switching device Q2, the third switching device Q3, and the fourth switching device Q4. For example, as shown in FIG. 10, driving of the first switching device Q1 and driving of the second switching device Q2 are complementary to each other, and driving of the third switching device Q3 and driving of the fourth switching device Q4 are complementary to each other. Duty cycles of the third switching device Q3 and the fourth switching device Q4 each are 0.5. The first switching device Q1 and the third switching device Q3 may be out of phase by 180°. That is, turn-on time of the first switching device Q1 is separated from turn-on time of the third switching device Q3 by a half of a period. The duty cycle of the first switching device Q1 may be adjusted in a range from 0 to 0.5. The output voltage of the direct current converter may be adjusted by using the duty cycle of the first switching device Q1, so that output closed-loop voltage regulation can be implemented. The control module may control the first switching device Q1 to be turned off, the second switching device Q2 to be turned on, the third switching device Q3 to be turned on, and the fourth switching device Q4 to be turned off. In this case, a working loop is a loop in which an input voltage Vin, the third switching device Q3, the direct current blocking capacitor C1, the second switching device Q2, and the primary coil of the transformer are located, and a current flow direction is from the third switching device Q3 to the direct current blocking capacitor C1. When the turn-on time of the third switching device Q3 is ½F, the control module controls the first switching device Q1 to be turned on, the second switching device Q2 to be turned off, the third switching device Q3 to be turned off, and the fourth switching device Q4 to be turned on. In this case, a working loop is a loop in which an input voltage Vin, the first switching device Q1, the direct current blocking capacitor C1, the fourth switching device Q4, and the primary coil of the transformer are located, and a current flow direction is from the direct current blocking capacitor C1 to the fourth switching device Q4. When the turn-on time of the first switching device Q1 is (first duty cycle*1)/F, the control module controls the first switching device Q1 to be turned off, the second switching device Q2 to be turned on, the third switching device Q3 to be turned off, and the fourth switching device Q4 to be turned on. In this case, a working loop is a loop in which the second switching device Q2, the direct current blocking capacitor C1, the fourth switching device Q4, and the primary coil of the transformer are located.

It can be understood from a topology symmetry principle that control logic of the switching devices Q1 to Q4 may be exchanged with each other. It is uniquely determined that duty cycles of the first switching device Q1 and the second switching device Q2 are complementary (that is, driving complementarity), and duty cycles of the third switching device Q3 and the fourth switching device Q4 are complementary (that is, driving complementarity). For example, the duty cycles of the first switching device Q1 and the second switching device Q2 each may be 0.5, and the fourth switching device Q4 and the second switching device Q2 may be out of phase by 180°. In this case, the control module may adjust the duty cycle of the fourth switching device Q4, to implement output voltage stabilization. For example, the duty cycles of the first switching device Q1 and the second switching device Q2 each may be 0.5, the third switching device Q3 and the first switching device Q1 may be out of phase by 180°, and the control module may adjust the duty cycle of the third switching device Q3, to implement output voltage stabilization. For example, the duty cycles of the third switching device Q3 and the fourth switching device Q4 each may be 0.5, the second switching device Q2 and the fourth switching device Q4 may be out of phase by 180°, and the control module may adjust the duty cycle of the second switching device Q2, to implement output voltage stabilization.

The rectifier module may include four diodes or four switching devices.

When the rectifier module includes four switching devices, first ends of the four switching devices are separately coupled to the control module, and the control module is further configured to control the four switching devices to perform unidirectional synchronous rectification.

Figure 11:
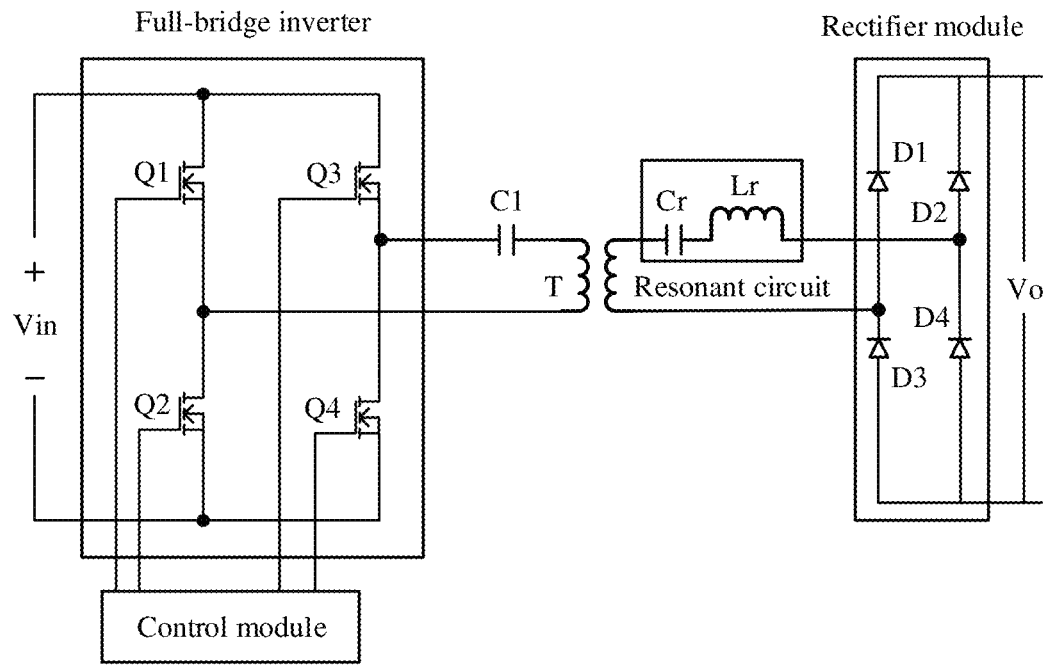
FIG. 11 is a schematic diagram of a structure of still another direct current converter according to an embodiment.
Figure 12:
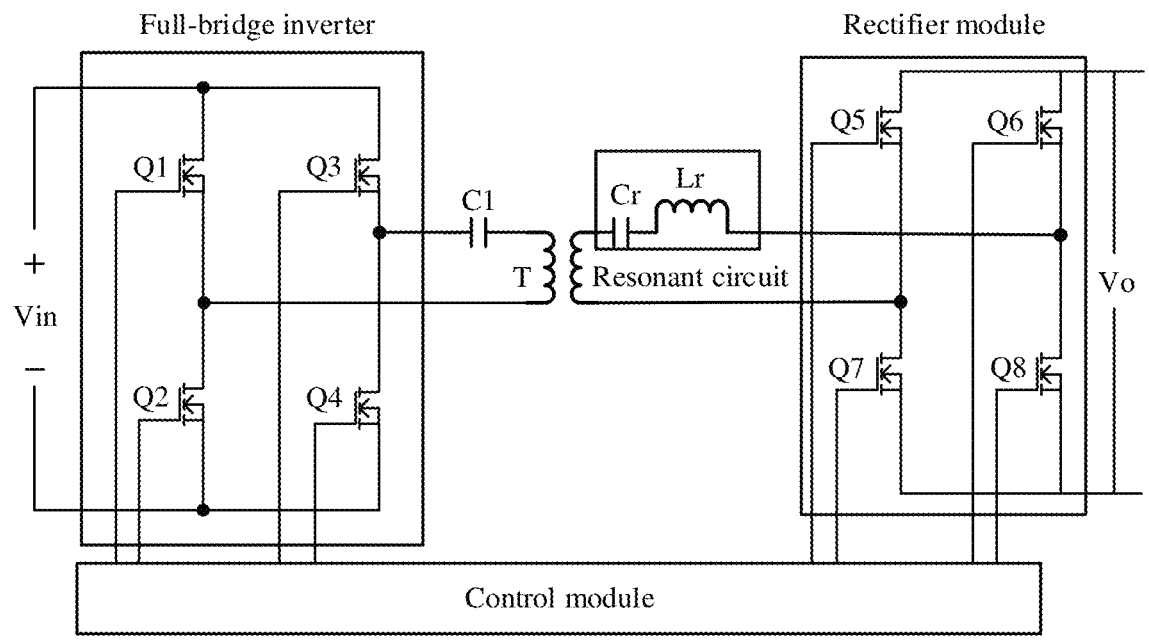
FIG. 12 is a schematic diagram of a structure of still another direct current converter according to an embodiment.

The following describes a structure of the rectifier module with reference to FIG. 11 and FIG. 12.

As shown in FIG. 11, the rectifier module may include four diodes D1 to D4. One end of the secondary coil of the transformer T is separately coupled to an anode of the diode D1 and a cathode of the diode D3. The other end of the secondary coil of the transformer T is separately coupled to an anode of the diode D2 and a cathode of the diode D4 through the resonant circuit. A cathode of the diode D1 is coupled to a cathode of the diode D2, and an anode of the diode D3 is coupled to an anode of the diode D4. When a current flow direction of the primary coil of the transformer T is from the direct current blocking capacitor C1 to the primary coil of the transformer T, a current flow direction of the secondary coil of the transformer T is from the secondary coil of the transformer T to the resonant capacitor Cr. In this case, the diode D2 and the diode D3 are turned on, and the diode D1 and the diode D4 are turned off. When a current flow direction of the primary coil of the transformer T is from the primary coil of the transformer T to the direct current blocking capacitor C1, a current flow direction of the secondary coil of the transformer T is from the resonant capacitor Cr to the secondary coil of the transformer T. In this case, the diode D2 and the diode D3 are turned off, and the diode D1 and the diode D4 are turned on, to convert an alternating current into a direct current.

The four diodes D1 to D4 have only a forward conduction current and there is no reverse current when the diodes are turned off.

As shown in FIG. 12, the rectifier module may include four switching devices Q5 to Q8. One end of the secondary coil of the transformer T is separately coupled to a third end of the switching device Q5 and a second end of the switching device Q7. The other end of the secondary coil of the transformer T is separately coupled to a third end of the switching device Q6 and a second end of the switching device Q8 through the resonant circuit. A second end of the switching device Q5 is coupled to a second end of the switching device Q6, and a third end of the switching device Q7 is coupled to a third end of the switching device Q8. First ends of the switching devices Q5 to Q8 are separately coupled to the control module. For example, when a current flow direction of the primary coil of the transformer T is from the direct current blocking capacitor C1 to the primary coil of the transformer T, a current flow direction of the secondary coil of the transformer T is from the secondary coil of the transformer T to the resonant capacitor Cr. In this case, the control module controls the switching device Q5 and the switching device Q8 to be turned on, and the switching device Q6 and the switching device Q7 to be turned off. When a current flow direction of the primary coil of the transformer T is from the primary coil of the transformer T to the direct current blocking capacitor C1, a current flow direction of the secondary coil of the transformer T is from the resonant capacitor Cr to the secondary coil of the transformer T. In this case, the control module controls the switching device Q5 and the switching device Q8 to be turned off, and the switching device Q6 and the switching device Q7 to be turned on, to convert an alternating current into a direct current.

That the switching devices Q5 to Q8 perform unidirectional synchronous rectification may be understood as: A reverse current is not allowed in a rectifier switching device, and before a reverse current appears, the control module controls the switching device to be turned off.

The working frequency of the direct current converter may further include working frequencies of the switching devices Q5 to Q8. The control module may further control the working frequencies of the switching devices Q5 to Q8 to be the first working frequency, so that the switching devices Q5 to Q8 may work in the soft switching state, to ensure that the switching devices Q5 to Q8 perform unidirectional synchronous rectification.

The direct current converters shown in FIG. 2 to FIG. 9, FIG. 11, and FIG. 12 are merely examples of diagrams of structures of the direct current converters. The resonant circuit may be shown in any one of FIG. 3 to FIG. 9, and the rectifier module may be shown in FIG. 11 or FIG. 12. The direct current converter may be any combination of the full-bridge inverter, the resonant circuit, and the rectifier module, and a structure is not limited.

In another case, a schematic diagram of the direct current converter may be shown in FIG. 2. The direct current converter may include a full-bridge inverter, a control module, a transformer, a resonant circuit, and a rectifier module. The full-bridge inverter may include a first switching device Q1, a second switching device Q2, a third switching device Q3, and a fourth switching device Q4. First ends of the first switching device Q1, the second switching device Q2, the third switching device Q3, and the fourth switching device Q4 are separately coupled to the control module. A second end of the first switching device Q1 is coupled to a second end of the third switching device Q3. A third end of the second switching device Q2 is coupled to a third end of the fourth switching device Q4. A third end of the first switching device Q1 is separately coupled to a second end of the second switching device Q2 and the transformer. A third end of the third switching device Q3 is separately coupled to a second end of the fourth switching device Q4 and the transformer. The transformer is further separately coupled to the resonant circuit and the rectifier module.

The control module is configured to adjust working time of the first switching device Q1 to first time, so that an output voltage of the direct current converter is a first voltage. The first time is less than or equal to working time of the fourth switching device Q4.

The control module is further configured to control working time of the third switching device Q3 to be second time, where an absolute value of a difference between the second time and a half of a resonant period of the resonant circuit is less than or equal to a threshold, so that a switching device other than the first switching device Q1 in the direct current converter works in a soft switching state.

It can be understood that driving of the first switching device Q1 and driving of the second switching device Q2 in the full-bridge inverter are complementary to each other, and driving of the third switching device Q3 and driving of the fourth switching device Q4 in the full-bridge inverter are complementary to each other. Driving complementarity may be understood as: When one switching device is turned on, the other switching device is turned off in a working period.

When a voltage required by a power supply device, apparatus, or module of the direct current converter is determined, that is, the output voltage of the direct current converter is determined, the control module may adjust the working time of the first switching device Q1, so that the output voltage of the direct current converter is the first voltage. That is, the control module may adjust the working time of the first switching device Q1, so that the output voltage of the direct current converter is the first voltage. In this case, the working time of the first switching device Q1 is the first time. In different application scenarios, different power supply architectures, or different devices, the first voltage may be different, and the first time may be different, to ensure that the direct current converter can meet different output voltages in different requirements. The first time is less than or equal to the working time of the fourth switching device Q4. That is, the working time of the first switching device Q1 in one period cannot be longer than the working time of the fourth switching device Q4.

That the control module controls the working time of the third switching device Q3 to be the second time, where the absolute value of the difference between the second time and the half of the resonant period of the resonant circuit is less than or equal to the threshold may be understood as: The control module controls the working time of the third switching device Q3 to be approximately equal to (that is, equal to as much as possible) the half (that is, the resonant period/2) of the resonant period of the resonant circuit. It can be understood that the working time of the third switching device Q1 is determined by the resonant period of the resonant circuit.

The threshold may be a fixed value. That is, values of the threshold in different direct current converters are the same. In this case, the threshold should be set to a small value, so that regardless of whether the resonant period of the resonant circuit is large or small, it can be ensured that the half of the resonant period is approximately equal to the working time of the third switching device Q3. Working time of a switching device is time in which the switching device is continuously turned on in one period.

The threshold may alternatively be variable. That is, the threshold may be different in different direct current converters. In this case, the threshold may be determined based on the resonant period of the resonant circuit. That is, the threshold may be different for different resonant periods of the resonant circuit. For example, when the resonant period of the resonant circuit is 0.01 second(s), the threshold may be 0.00001.

The foregoing is an example of determining the threshold based on the resonant period of the resonant circuit and does not constitute a limitation thereto.

The control module may control working frequencies of the first switching device Q1, the second switching device Q2, the third switching device Q3, and the fourth switching device Q4 to be the same, that is, periods (such as working periods) of the first switching device Q1, the second switching device Q2, the third switching device Q3, and the fourth switching device Q4 to be the same. Working frequencies of the four switching devices may be the same as or different from a resonant frequency of the resonant circuit.

Figure 13:
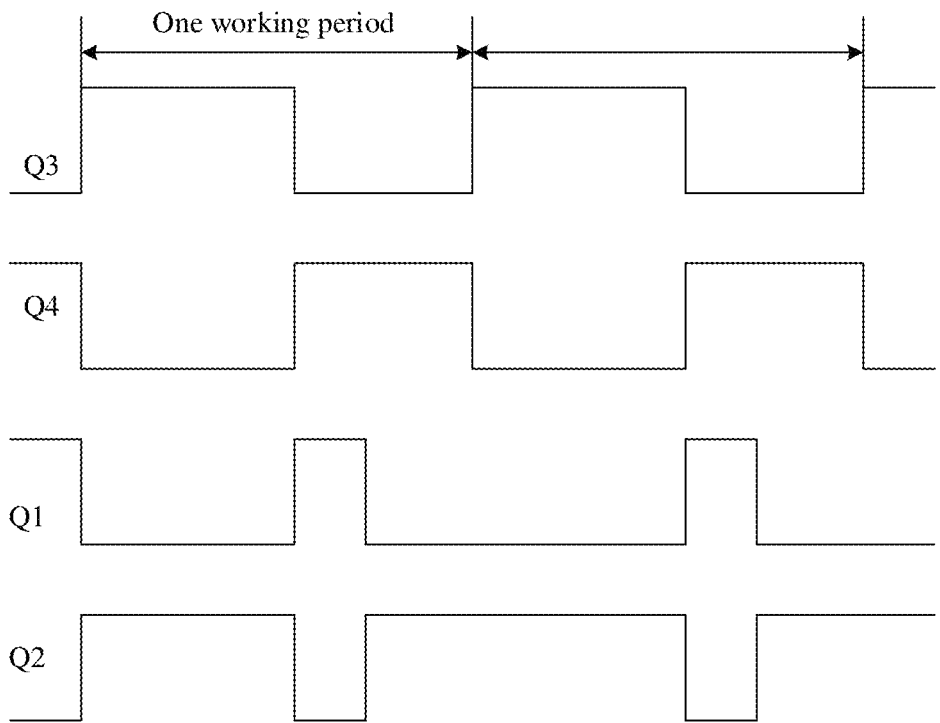
FIG. 13 is another working sequence diagram of a full-bridge inverter according to an embodiment.

For example, FIG. 13 is another working sequence diagram of the first switching device Q1, the second switching device Q2, the third switching device Q3, and the fourth switching device Q4. As shown in FIG. 13, driving of the first switching device Q1 and driving of the second switching device Q2 are complementary to each other, and driving of the third switching device Q3 and driving of the fourth switching device Q4 are complementary to each other. The control module may control the first switching device Q1 to be turned off, the second switching device Q2 to be turned on, the third switching device Q3 to be turned on, and the fourth switching device Q4 to be turned off. In this case, a working loop is a loop in which an input voltage Vin, the third switching device Q3, and the second switching device Q2 are located. When turn-on time of the third switching device Q3 is ½F1, the control module controls the first switching device Q1 to be turned on, the second switching device Q2 to be turned off, the third switching device Q3 to be turned off, and the fourth switching device Q4 to be turned on. In this case, a working loop is a loop in which an input voltage Vin, the first switching device Q1, and the fourth switching device Q4 are located. When turn-on time of the first switching device Q1 is the first time, the control module controls the first switching device Q1 to be turned off, the second switching device Q2 to be turned on, the third switching device Q3 to be turned off, and the fourth switching device Q4 to be turned on. In this case, a working loop is a loop in which the second switching device Q2 and the fourth switching device Q4 are located. The first switching device Q1 and the third switching device Q3 may be out of phase by 180°, or by a degree greater than 180°. F1 is the resonant frequency of the resonant circuit.

In FIG. 13, a working period of a switching device is less than the resonant period of the resonant circuit, that is, a working frequency of the switching device is greater than the resonant frequency of the resonant circuit. The working period of the switching device may alternatively be greater than the resonant period of the resonant circuit, and the working period of the switching device may alternatively be equal to the resonant period of the resonant circuit.

It can be understood from a topology symmetry principle that control logic of the switching devices Q1 to Q4 may be exchanged with each other. It is uniquely determined that duty cycles of the first switching device Q1 and the second switching device Q2 are complementary, and duty cycles of the third switching device Q3 and the fourth switching device Q4 are complementary. For example, the working time of the first switching device Q1 may be fixed, that is, ½F1, and the working time of the third switching device Q3 is less than or equal to working time of the second switching device Q2. In this case, the control module may adjust the working time of the third switching device Q3, to implement output voltage stabilization. The third switching device Q3 and the first switching device Q1 may be out of phase by 180°, or by a degree greater than 180°.

In a case, the direct current converter may further include a direct current blocking capacitor C1. One end of a primary coil of the transformer T is coupled to the third end of the first switching device Q1, the other end of the primary coil of the transformer T is coupled to the third end of the third switching device Q3 through the direct current blocking capacitor C1, and a secondary coil of the transformer T is coupled to the rectifier module through the resonant circuit.

The resonant circuit may include a resonant capacitor Cr and a resonant inductor Lr. The direct current blocking capacitor C1 is greater than the resonant capacitor Cr, and a magnetic inductor of the transformer T is greater than the resonant inductor Lr.

In another case, the resonant circuit may include a resonant capacitor Cr and a resonant inductor Lr. One end of a primary coil of the transformer T is coupled to the third end of the first switching device Q1, and the other end of the primary coil of the transformer T is coupled to the third end of the third switching device Q3 through the resonant capacitor Cr. One end of a secondary coil of the transformer T is coupled to the rectifier module, and the other end of the secondary coil of the transformer T is coupled to the rectifier module through the resonant inductor Lr. A magnetic inductor of the transformer T may be greater than the resonant inductor Lr.

Optionally, the direct current converter may further include a direct current blocking capacitor C1. The direct current blocking capacitor C1 is coupled to the resonant inductor Lr in series, and the direct current blocking capacitor C1 is greater than the resonant capacitor Cr.

The rectifier module may include four diodes or four switching devices.

When the rectifier module includes four switching devices, first ends of the four switching devices are separately coupled to the control module, and the control module is further configured to control the four switching devices to perform unidirectional synchronous rectification.

The switching device may be any one of a MOSFET, an IGBT, a GaN switching device, or a SiC switching device.

For detailed descriptions of the resonant circuit, the rectifier module, and the like, refer to the foregoing related descriptions. Details are not described herein again.

For a structure of the direct current converter, refer to FIG. 2 to FIG. 9, FIG. 11, and FIG. 12. Details are not described herein again.

Figure 14:
FIG. 14 is a schematic diagram of a structure of a communication device according to an embodiment.

The direct current converter may be used in a communication device. FIG. 14 is a schematic diagram of a structure of a communication device according to an embodiment. As shown in FIG. 14, the communication device may include a transceiver and a direct current converter coupled to the transceiver.

The direct current converter is configured to supply power to the transceiver, and the transceiver is configured to receive and transmit a signal.

The communication device may be a wired communication device, for example, a server, a router, or a switch. The communication device may alternatively be a wireless communication device, for example, a terminal device, an access network device, or a core network device. When the communication device is a wireless communication device, the communication device may further include a baseband module, a radio frequency module, and the like.

Figure 15:
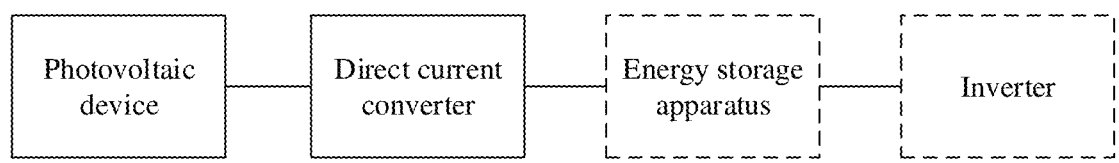
FIG. 15 is a schematic diagram a structure of a photovoltaic system according to an embodiment.

A direct current power supply system can also be used in a photovoltaic system. FIG. 15 is a schematic diagram a structure of a photovoltaic system according to an embodiment. As shown in FIG. 15, the photovoltaic system may include a photovoltaic device and a direct current converter coupled to the photovoltaic device.

The photovoltaic device is configured to provide a first direct current for the direct current converter.

The direct current converter is configured to convert the first direct current into a second direct current.

Optionally, the photovoltaic system may further include an energy storage apparatus, and the direct current converter is coupled to a power grid through the storage apparatus.

Optionally, the photovoltaic system may further include an inverter, and the energy storage apparatus is coupled to the power grid through the inverter.

For a structure of the direct current converter, refer to any one of FIG. 2 to FIG. 9, FIG. 11, and FIG. 12.

In addition, the direct current converter may be further used in an energy storage system. For a structure of the energy storage system, refer to the structure of the photovoltaic system. In this case, the photovoltaic device in FIG. 15 may be replaced with a battery device. Others are similar to those in FIG. 15.

In addition, the direct current converter may be further used in a Photovoltaic energy storage system. The Photovoltaic energy storage system may include a photovoltaic system and a storage system.

In the foregoing implementations, the objectives, solutions, and beneficial effects are further described in detail. The foregoing descriptions are merely implementations but are not intended to limit the scope of the embodiments. Any modification, equivalent replacement, improvement, or the like made based on the solutions of the embodiments shall fall within their scope.

What is claimed is:

1. A direct current converter, comprising:
   a full-bridge inverter, wherein the full-bridge inverter comprises a first switching device, a second switching device, a third switching device, and a fourth switching device;
   a control module;
   a transformer;
   a resonant circuit;
   a rectifier module, wherein first ends of the first switching device, the second switching device, the third switching device, and the fourth switching device are separately coupled to the control module, a second end of the first switching device is coupled to a second end of the third switching device, a third end of the second switching device is coupled to a third end of the fourth switching device, a third end of the first switching device is separately coupled to a second end of the second switching device and the transformer, a third end of the third switching device is separately coupled to a second end of the fourth switching device and the transformer, and the transformer is further separately coupled to the resonant circuit and the rectifier module;
   a direct current blocking capacitor, wherein one end of a primary coil of the transformer is coupled to the third end of the first switching device, the other end of the primary coil of the transformer is coupled to the third end of the third switching device through the direct current blocking capacitor, and a secondary coil of the transformer is coupled to the rectifier module through the resonant circuit; and
   the resonant circuit comprises a resonant capacitor and a resonant inductor, a capacitance of the direct current blocking capacitor is greater than a capacitance of the resonant capacitor, and an inductance of a magnetic inductor of the transformer is greater than an inductance of the resonant inductor;
   the control module is configured to:
   adjust a duty cycle of the first switching device, the second switching device, the third switching device, or the fourth switching device to a first duty cycle, so that an output voltage of the direct current converter is a first voltage, wherein the first duty cycle is greater than 0 and less than or equal to 0.5; and
   control a working frequency of the direct current converter to be a first working frequency, wherein an absolute value of a difference between the first working frequency and a resonant frequency of the resonant circuit is less than or equal to a threshold, so that a switching device other than the first switching device, the second switching device, the third switching device, or the fourth switching device that is adjusted in the direct current converter works in a soft switching state.

2. The direct current converter according to claim 1, wherein one end of a primary coil of the transformer is coupled to the third end of the first switching device, the other end of the primary coil of the transformer is coupled to the third end of the third switching device through the resonant capacitor, one end of a secondary coil of the transformer is coupled to the rectifier module, the other end of the secondary coil of the transformer is coupled to the rectifier module through the resonant inductor.

3. The direct current converter according to claim 1, wherein the control module is further configured to:
control working frequencies of the first switching device, the second switching device, the third switching device, and the fourth switching device to be the first working frequency, and the resonant frequency to be $1/2\pi\sqrt{LrCr}$, wherein Lr is an inductance of the resonant inductor, and Cr is a capacitance of the resonant capacitor.

4. The direct current converter according to claim 1, wherein the rectifier module comprises four switching devices, first ends of the four switching devices are separately coupled to the control module, and the control module is further configured to control the four switching devices to perform unidirectional synchronous rectification.

5. The direct current converter according to claim 1, wherein the rectifier module comprises four diodes.

6. A direct current converter, comprising
a full-bridge inverter, wherein the full-bridge inverter comprises a first switching device, a second switching device, a third switching device, and a fourth switching device;
a control module;
a transformer;
a resonant circuit;
a rectifier module, wherein first ends of the first switching device, the second switching device, the third switching device, and the fourth switching device are separately coupled to the control module, a second end of the first switching device is coupled to a second end of the third switching device, a third end of the second switching device is coupled to a third end of the fourth switching device, a third end of the first switching device is separately coupled to a second end of the second switching device and the transformer, a third end of the third switching device is separately coupled to a second end of the fourth switching device and the transformer, and the transformer is further separately coupled to the resonant circuit and the rectifier module;
a direct current blocking capacitor, wherein one end of a primary coil of the transformer is coupled to the third end of the first switching device, the other end of the primary coil of the transformer is coupled to the third end of the third switching device through the direct current blocking capacitor, and a secondary coil of the transformer is coupled to the rectifier module through the resonant circuit; and
the resonant circuit comprises a resonant capacitor and a resonant inductor, a capacitance of the direct current blocking capacitor is greater than a capacitance of the resonant capacitor, and an inductance of a magnetic inductor of the transformer is greater than an inductance of the resonant inductor;
the control module is configured to:
adjust a working time of the first switching device to a first time, so that an output voltage of the direct current converter is a first voltage, wherein the first time is less than or equal to a working time of the fourth switching device; and
control a working time of the third switching device to be a second time, wherein an absolute value of a difference between the second time and a half of a resonant period of the resonant circuit is less than or equal to a threshold, so that a switching device other than the first switching device in the direct current converter works in a soft switching state.

7. The direct current converter according to claim 6, wherein one end of a primary coil of the transformer is coupled to the third end of the first switching device, the other end of the primary coil of the transformer is coupled to the third end of the third switching device through the resonant capacitor, one end of a secondary coil of the transformer is coupled to the rectifier module, the other end of the secondary coil of the transformer is coupled to the rectifier module through the resonant inductor.

8. The direct current converter according to claim 6, wherein the resonant period is $2\pi\sqrt{LrCr}$, Lr is an inductance of the resonant inductor, and Cr is a capacitance of the resonant capacitor.

9. The direct current converter according to claim 6, wherein the rectifier module comprises four switching devices, first ends of the four switching devices are separately coupled to the control module, and the control module is further configured to control the four switching devices to perform unidirectional synchronous rectification.

10. The direct current converter according to claim 6, wherein the rectifier module comprises four diodes.

11. A photovoltaic system comprising:
a photovoltaic device; and
a direct current converter coupled to the photovoltaic device, wherein
the direct current converter comprises:
a full-bridge inverter, wherein the full-bridge inverter comprises a first switching device, a second switching device, a third switching device, and a fourth switching device;
a control module;
a transformer;
a resonant circuit; and
a rectifier module, wherein first ends of the first switching device, the second switching device, the third switching device, and the fourth switching device are separately coupled to the control module, a second end of the first switching device is coupled to a second end of the third switching device, a third end of the second switching device is coupled to a third end of the fourth switching device, a third end of the first switching device is separately coupled to a second end of the second switching device and the transformer, a third end of the third switching device is separately coupled to a second end of the fourth switching device and the transformer, and the transformer is further separately coupled to the resonant circuit and the rectifier module;
a direct current blocking capacitor, wherein one end of a primary coil of the transformer is coupled to the third end of the first switching device, the other end of the primary coil of the transformer is coupled to the third end of the third switching device through the direct current blocking capacitor, and a secondary coil of the transformer is coupled to the rectifier module through the resonant circuit; and
the resonant circuit comprises a resonant capacitor and a resonant inductor, a capacitance of the direct current blocking capacitor is greater than a capacitance of the resonant capacitor, and an inductance of a magnetic inductor of the transformer is greater than an inductance of the resonant inductor;

the control module is configured to:

adjust a duty cycle of the first switching device, the second switching device, the third switching device, or the fourth switching device to a first duty cycle, so that an output voltage of the direct current converter is a first voltage, wherein the first duty cycle is greater than 0 and less than or equal to 0.5; and control a working frequency of the direct current converter to be a first working frequency, wherein an absolute value of a difference between the first working frequency and a resonant frequency of the resonant circuit is less than or equal to a threshold, so that a switching device other than the first switching device, the second switching device, the third switching device, or the fourth switching device that is adjusted in the direct current converter works in a soft switching state, and the photovoltaic device is configured to provide a first direct current for the direct current converter.

12. The photovoltaic system according to claim 11, further comprising:

an energy storage apparatus, wherein the direct current converter is coupled to a power grid through the storage apparatus.

13. The photovoltaic system according to claim 12, further comprising:

an inverter, wherein the energy storage apparatus is coupled to the power grid through the inverter.

* * * * *